(12) United States Patent
Ames et al.

(10) Patent No.: US 7,062,164 B2
(45) Date of Patent: Jun. 13, 2006

(54) DETECTION OF DATA TRANSMISSION RATES USING PASSING FREQUENCY-SELECTIVE FILTERING

(75) Inventors: Stephen John Ames, Rochester, MN (US); Roy Kearns Ball, Austin, MN (US); Clint Lee Schow, Goleta, CA (US); Christopher Keith White, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 09/893,222

(22) Filed: Jun. 27, 2001

(65) Prior Publication Data

US 2003/0002108 A1    Jan. 2, 2003

(51) Int. Cl.
*H04B 10/08* (2006.01)
*H04B 17/00* (2006.01)
*H04B 3/46* (2006.01)
*H04B 10/06* (2006.01)
*H04Q 1/20* (2006.01)

(52) U.S. Cl. ............ 398/25; 375/225; 324/76.41; 324/76.47; 398/202

(58) Field of Classification Search ............ 398/135, 398/202, 25, 26; 375/225; 356/213; 324/76.41, 324/76.47
See application file for complete search history.

(56) References Cited

U.S. PATENT DOCUMENTS 4,887,280 A * 12/1989 Reisenfeld .............. 375/377

6,307,443 B1 * 10/2001 Gabara .................. 333/17.1
6,684,033 B1 * 1/2004 Doh et al. ............... 398/202
2002/0149821 A1 * 10/2002 Aronson et al. ........... 359/152

OTHER PUBLICATIONS

"Bandpass Filters with Steep Skirt Selectivity"; Torgow et al.; PTGMTT International Symposium Digest, 1964, vol. 64, Issue 1, May 1964, pp. 22-26.*
Newton's Telecom Dictionary; CMP Books; 19th Edition—Mar. 2003; pp. 409 and 414.*
Merriam-Webster's Collegiate Dicationary; Merriam-Webster, Inc.; 10th Edition—2000; p. 323.*
Johns, David and Martin, Ken, *Analog Integrated Circuit Design,* John Wiley & Sons, Inc. 1997, pp. 414-423, 574-585, 626-637.

* cited by examiner

*Primary Examiner*—M. R. Sedighian
*Assistant Examiner*—Nathan Curs
(74) *Attorney, Agent, or Firm*—Robert R. Williams (57) ABSTRACT

A data receiver, which could be an optical transceiver, a modem, a router hub, is capable of detecting the transmission rate of incoming data. The data is converted to electrical waves appropriate for passive or active bandpass filtering. The frequencies at which the waves are filtered are determined from a plurality of known possible transmission rates and are chosen as having the most detectable difference in the power spectra. By implementing a filter at the corresponding frequency(ies), data having that (those) frequency (ies) will be transmitted. A signal detector then can receive a signal transmitted through the filter and determine the corresponding data rate. It is further contemplated that the multiple frequencies can be filtered by using stages of filters and signal detectors for different frequencies or by filters and detectors capable of multiple frequency operation.

16 Claims, 6 Drawing Sheets

DETECTION OF DATA TRANSMISSION RATES USING PASSING FREQUENCY-SELECTIVE FILTERING

FIELD OF THE INVENTION

This invention relates generally to the field of data transmission and more specifically relates to automatically resolving the rate of data transmission from known data rates by using at least a passing frequency-selective filter and a signal detector.

BACKGROUND OF THE INVENTION

Increasingly so, today's communications uses optical data transmitted through, for instance, a fiber optic cable. At the receiving end of a fiber optic link, a photodetector receives the light which may be short wavelength and/or long wavelength light and generates an electrical current proportional to the intensity or power of the light. This photocurrent is then conditioned and coupled to a transimpedance amplifier which converts the photocurrent into a proportionally scaled output voltage signal. The photoreceiver, may be comprised of the photodetector and the transimpedance amplifier, can be packaged into a TO can. On the other end of the TO can are electrical contact pins to transmit electrical data output derived from the optical input and power and ground pins. The output of the photoreceiver can be input into a host data processing system, such as a computer via the electrical contact pins.

Just as electrical data can be transmitted at different speeds, so is optical data transmitted at different speeds. Autonegotiation is the process by which two transceivers capable of multiple bit-rate operation communicate according to a defined protocol to establish the highest data transfer rate possible between the two transceivers. A common example of an autonegotiation occurs between computer modems, where the devices "negotiate" until the highest possible baud rate is established.

Autonegotiation in optical networking standards has become a very hot topic because new multi-gigabit per second (Gb/s) standards are being developed. There is, however, a strong desire from end users for the newer high speed transceiver modules to interoperate with the large installed base of devices capable of only lower-speed operation. One excellent example can be found in the Fibre Channel market where there is a large effort to implement an autonegotiation protocol to ensure that the faster 2.125 Gb/s modules can successfully communicate with the older, widely deployed 1.0625 Gb/s modules.

One of the main transceiver module parameters that is an obstacle to multiple bit rate operation is the bandwidth of the receiver path in an optical transceiver. Transmission errors arise when the optical signal from a lower speed module is presented to a high-bandwidth receiver in a high-speed module. As mentioned, there are many older Fibre Channel optical transceivers that operate at 1.0625 Gb/s and utilize lasers with low relaxation oscillation frequencies (ROF) that introduce substantial overshoot and undershoot in the "1" level of transmitted bits. When one of these low ROF lasers is used as the input to a 2.125 Gb/s module, it will not be sufficiently attenuated and can result in an incorrectly received bit if the bandwidth of the receiver in the higher speed module is too high.

There are two known autonegotiation methods to alleviate the above problems. The first uses clock recovery techniques to detect the data rate wherein the fundamental clock frequency of an incoming data stream is detected and regenerated. Circuits that perform this function are widely available and the technology is mature. Nevertheless, a reference clock signal is required along with a clock recovery circuit in order to determine the actual frequency of the recovered clock and therefore the bit rate of the transmitted data. The other known method to alleviate this problem is to implement a switchable bandwidth receiver wherein the bandwidth of the receiver is lowered for low-speed operation and maintained at it's highest value for high-speed operation, such as disclosed in U.S. Ser. No. 09/574,239 now U.S. Pat. No. 6,862,322 entitled Switchable-Bandwidth Optical Receiver, filed 19 May 2000, which is commonly owned by the assignee herein and which is incorporated by reference in its entirety. The described method provides a control signal to an optical transceiver that modifies certain aspects of the transceiver's performance to allow operation at multiple bit rates. Even a switchable-bandwidth receiver as described, however, requires a control signal to determine when the receiver's bandwidth needs to be modified.

There is thus a need in the industry for a low cost, easy-to-implement, and fully self-contained data rate detector and a method of data rate autodetection that allows selection of the data rate of an incoming digital signal without an external control signal or complicated clock recovery schemes.

Other objects, features, and characteristics of the invention; methods, operation, and functions of the related elements of the structure; combination of parts; and economies of manufacture will become apparent from the following detailed description of the preferred embodiments and accompanying figures, all of which form a part of this specification, wherein like reference numerals designate corresponding parts in the various figures.

SUMMARY OF THE INVENTION

To satisfy the above objects and to give the industry a solution to the problems stated above, what is presented herein is a data rate detector, comprising: an input interface to receive a digital signal having a data rate that is one of at least two known data rates; a frequency-selective filter assembly coupled to the input interface and includes a first filter to pass a signal when at least a selected difference of spectral power at a first selected filtered frequency exists between the one known data rate of the signal relative to the other of the two known data rates of the filter; and, a signal detector coupled to the filter to detect the passed signal and output a data rate signal related thereto.

The frequency-selective filter assembly that includes at least a second filter coupled to the input interface to receive a digital signal having a data rate that is at a third known data rate, the second filter passes a signal when at least a selected difference of spectral power at a second selected filtered frequency exists among the third known data rate and the two known data rates, and a second signal detector detect the passed signal of the second filter and outputs a corresponding data rate signal related thereto.

The frequency-selective filter assembly includes a tunable filter having a circuit logic that allows shifting of the power spectra of the one known data rate to accommodate passing of different select data rates through a single filter.

The data rate detector may further comprise a passive filter, which may be a Butterworth filter. The data rate detector may comprise an active filter. The active filter could be a biquad filter, a transconductance filter, or a DSP filter.

The invention also includes an optical transceiver comprising: an optical receiver having a photodetector to receive an optical input and a transimpedance amplifier to generate an electrical signal in response thereto; a signal rate detector comprising: an input interface to receive a digital signal having a data rate that is one of at least two known data rates; a frequency-selective filter assembly including a first filter coupled to the input interface to pass a signal when at least a selected difference of spectral power at a selected filtered frequency exists between one known data rate relative to the other of the two known data rates; and, a signal detector coupled to the filter to detect the passed signal and output a data rate signal related thereto.

The optical transceiver may further comprise an ac modulator to receive host input through the host interface and generate an electrical output. An optical transmitter to receive the electrical input and in response thereto generate an optical output, which may be a laser.

The invention is also considered a method of detecting the transmission rate of a data signal, comprising the steps of detecting signal rates including using a frequency-selective filter assembly including a first filter coupled to the input interface to pass a signal when at least a selected difference of spectral power at a selected filtered frequency exists between one known data rate relative to the other of the two known data rates.

DESCRIPTION OF THE DRAWING

Thus, having been summarized, the invention will best be understood by reference to the following description and the Drawing in which.

DETAILED DESCRIPTION OF THE INVENTION

Figure 1:
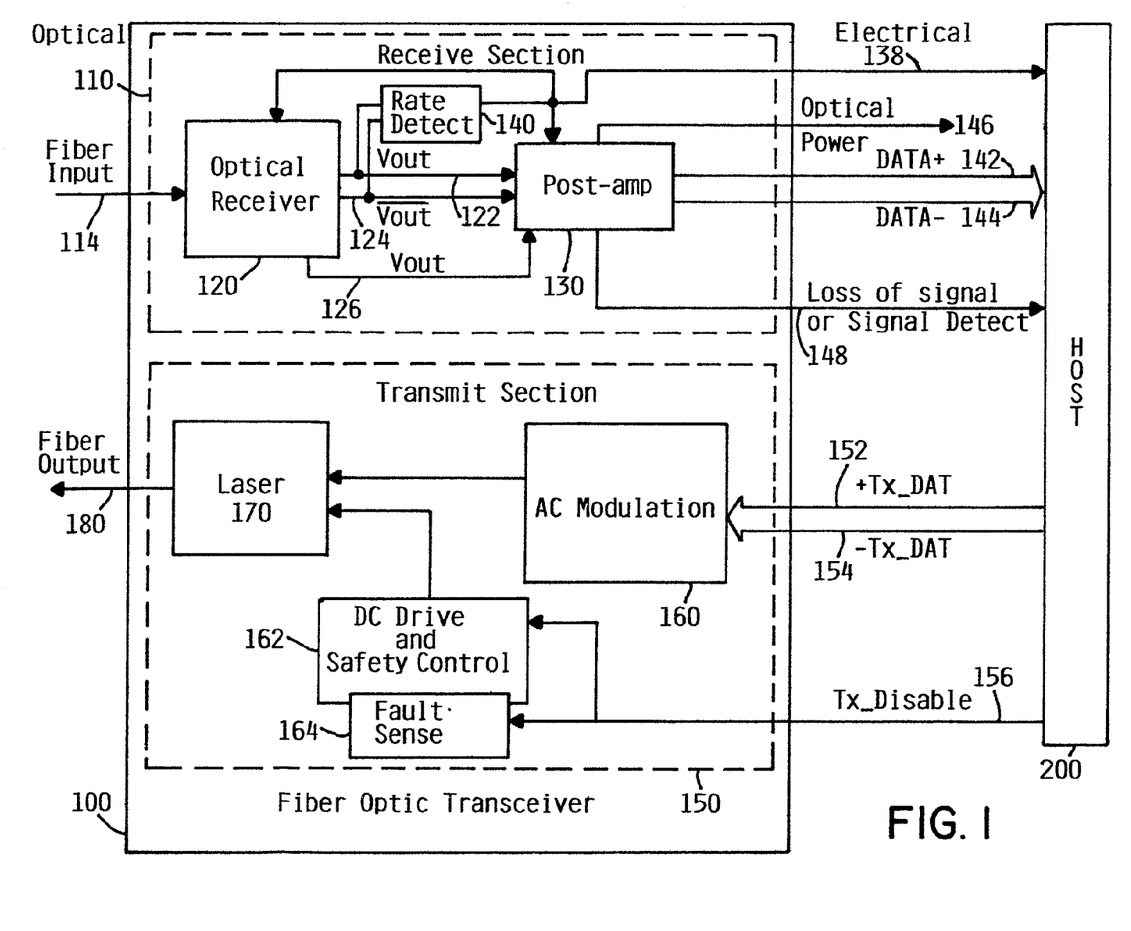
FIG. 1 is a high-level block diagram of an optical transceiver.

FIG. 1 is a simplified block diagram of a fiber optic transceiver 100 depicting a receive section 110 and a transmit section 150. The fiber optic transceiver 100 preferably provides a high-speed serial or parallel electrical interface for connecting to a host 200, such as computer or device processors, switches, and peripherals through an optical fiber cable. Specific systems which would benefit from the invention are fiber optic applications in Gigabit Ethernet, Infiniband, OIF, SONET, and Fibre Channel for multi-gigabit data rates. Furthermore, although the integrated circuits herein usually of silicon CMOS and/or bipolar semiconductor technologies, one of skill in the art will understand that other semiconductor materials may be used for other speeds of data transmission or other wavelengths of light. In the Gigabit Ethernet environment, for example, transceiver 100 can be used in such as a host 200 as local area network (LAN) switches or hubs, as well as in interconnecting processors. In storage area networks (SANs) as host 200, the transceiver 100 can be used for transmitting data between peripheral devices and processors. Thus, the host 200 may be an electronic switch, a network interface to another system, a computer, a processor with a computer, indeed, any electronic device that may receive data from the transceiver 100.

The transmit section 150 of the transceiver 100 is coupled to the host 200 which preferably provides a differential data stream 152 and 154. The AC modulator 160 of the transceiver 100 is part of the laser driver circuitry which modulates the output optical intensity 180 of a semiconductor laser 170. The DC drive and safety control circuits 162 maintain the laser at a proper power level which may be present and in conjunction with safety circuits and a fault sensor 164, the transmit section 150 will shut off the laser 170 if a disable signal 156 is detected.

The receive section 110 may further comprise an optical receiver 120 have a photodetector which receives the incoming modulated optical signal 114 and converts it to a proportional peak-to-peak photocurrent. Typically, the optical input 114 may be light having a longer wavelength on the order of 1.0 to 1.8 micrometers and/or a shorter wavelength on the order of 0.6 to 1.0 micrometers. Those of skill in the art will realize that the wavelength of the light and indeed the fact that the embodiment describes optical data is a detail and that the features of the invention are not limited to any particular wavelength of light or radiation but is applicable to incoming electrical digital data as well. For example, any digital device such as an I/O interface can be used. If the incoming signals are optical in nature, then the photocurrent is input to a transimpedance amplifier within the optical receiver 120 where it is converted to a peak-to-peak voltage that is conditioned and amplified. The transimpedance amplifier then provides two outputs: a true and complement of the output signal voltage signal 122 and 124, respectively. The transimpedance amplifier may also output a common mode voltage 126 derived from signal 122 and 124 that is proportional to the peak received optical power which may also be processed by the post amplifier 130 and delivered to the host 200 as an optical power meter signal 146 in accordance with U.S. Ser. No. 09/761,526 entitled Transimpedance Amplifier with Optical Power Meter Function filed 16 Jan. 2001, which is also commonly owned by the assignee herein and which is hereby incorporated by reference in its entirety. A signal 148 indicating the detection and loss of a signal and a detection of signal may further be provided to the host 200.

The electrical signals 122, 124 may then be amplified and converted to a differential serial output data stream 142, 144 and delivered to the host 200. In accordance with an embodiment of the invention, the electrical signals 122, 124 are also input to a rate detection circuit 140 which detects the rate of transmission of the optical data input 114 and provides a signal output 138 to the host 200, and possibly the optical receiver 120 and the post amplifier 130. In response to the signal output 138 indicating the incoming data rate, the host 200 may thereby adjust the data rates at which it tries to receive and send data. When the signal output 138 is provided to the optical receiver 120 and the post amplifier 130, they may adjust their bandwidth in response to the signal output 138. The post amplifier 130 may further adjust to use less power if the data rate is at a lower speed.

Figure 2:
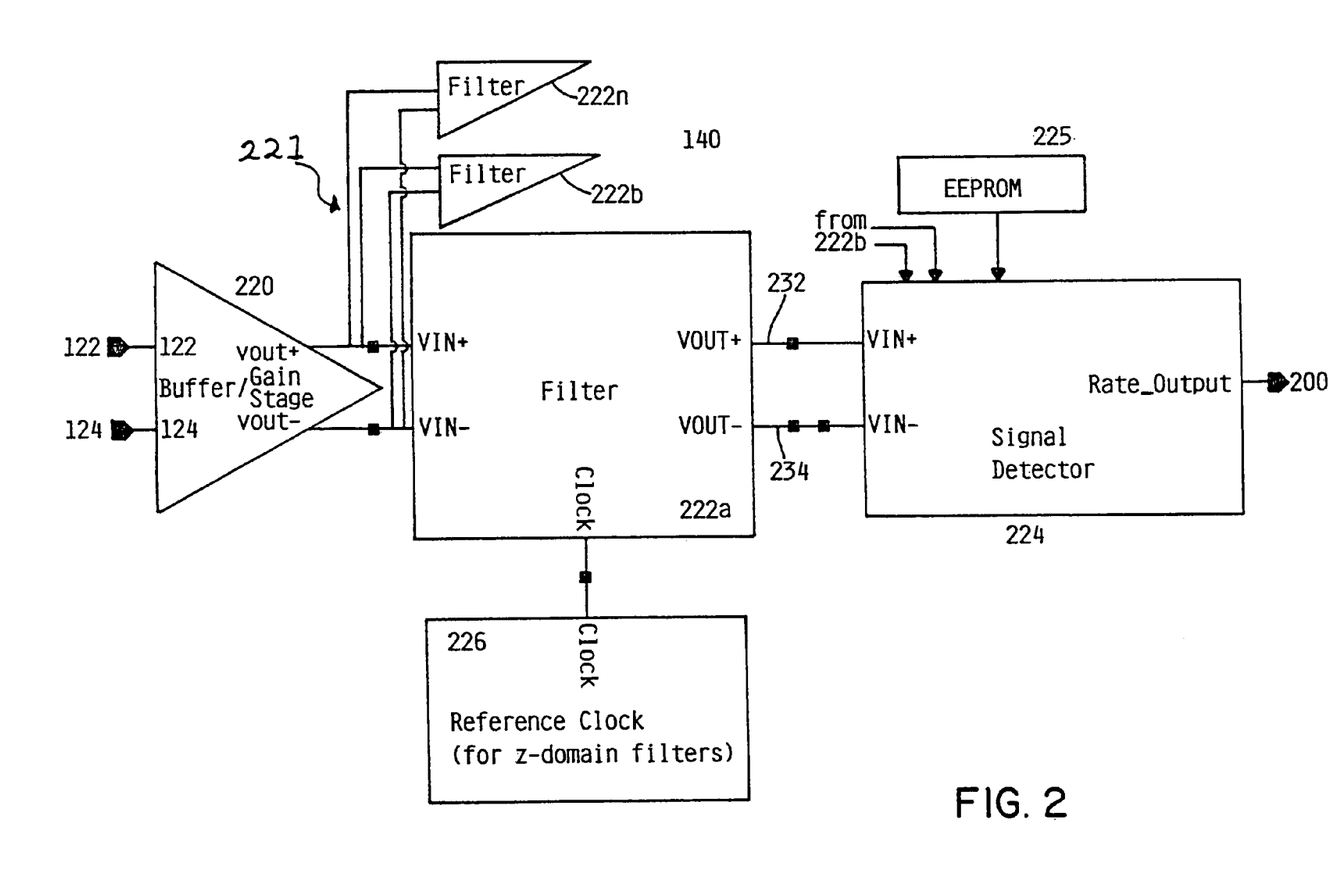
FIG. 2 is a high-level block diagram of a data rate detector within an optical receiver.

FIG. 2 is a simplified block diagram of the data rate detector 140. Preferably data rate detector 140 is integrated with the post amplifier 130 and a transmit section 150 of a fiber optic transceiver 100 shown in FIG. 1. While shown here as a detector of the rate of optical signals, the data rate detector herein may be applied to any incoming digital signal. Although the preferred embodiment of the invention herein relates to the incorporation of the data rate detector and the bit-rate discovery method in optical transceivers, it is broadly applicable to any devices used to transfer or analyze incoming digital data, whether they be electrical, optical, etc. In the field of data communications, the data detector 140 could be implemented in an electrical transceiver in such systems as modems, switches, hubs, routers, etc. The circuit and principles of the invention herein are particularly useful when the data rate is one of several known frequencies which are integer multiples of each other. However, the present invention is not limited to the data rates being integer multiples of each other.

The data rate detector 140 comprises an input interface device, such as buffer and/or gain stage 220, a passing frequency-selective filter assembly 221 that comprises in one embodiment 1 to "n" passing frequency-selective filters 222a, 222b, . . . 222n, such as a bandpass filter, a signal detector 224, and may also include a clock reference unit 226. The clock reference unit 226 is active when the filter is operating on digital signals in the z-domain. Input to the buffer and gain stage 220 are a true and complement of the output signal voltage signals 122, 124. The buffer/gain stage 220 serves two purposes: first, it isolates the filter assembly 221 from the post amplifier 130, and second, it enlarges the signals 122, 124 for easier detection. The buffer/gain stage 220, however, need not receive two signals; it may only receive one signal. Each one of the bandpass filters then receives the output of the buffer/gain stage 220 in either a true and complement configuration or a single signal configuration. Each of the bandpass filters inhibits all frequencies, but the one for which each is designed, as will be discussed and outputs the true and complement 232, 234 (or single signal) from each to a signal detector 224. Hence, for example, with two filters in the filter assembly, the present invention can detect three signals with respectively different known data rates. Each bandpass filter would use a corresponding signal detector (not shown).

Continued reference is made to FIG. 2, wherein the filter 222a instead of being an array or assemblage of filters could be a tunable filter that in one embodiment allows the selected frequency of the filter to fall precisely on the first null of the fundamental data rate's power spectrum. In such an embodiment, the tunable filter could include a known tunable circuit (not shown) that would be connected to a feedback circuit (not shown). Alternatively, the tunable filter can be manually adjustable through for example a potentiometer (not shown). The filter 222a could be a tunable filter integrated with a logic circuit including a digital memory device, such as an EEPROM that would allow the filter to pass multiple rates by allowing values of the EEPROM to alter the selected passing frequency to occur at data rates other than twice the fundamental data rate.

It will be appreciated that suitable provisions would have to be made to alter correspondingly the voltage reference values of the signal detector 224 when a selected filtered frequency is changed so that the signal detector will function properly in detecting the selected rates. One approach for achieving this is to include in the detector a digital memory device such as an EEPROM 225 that may be coupled to the reference voltage generator and comparator (see FIG. 6). Of course, with a digital memory device the signal detector could be provided with a digital-to-analog convertor.

Figure 3:
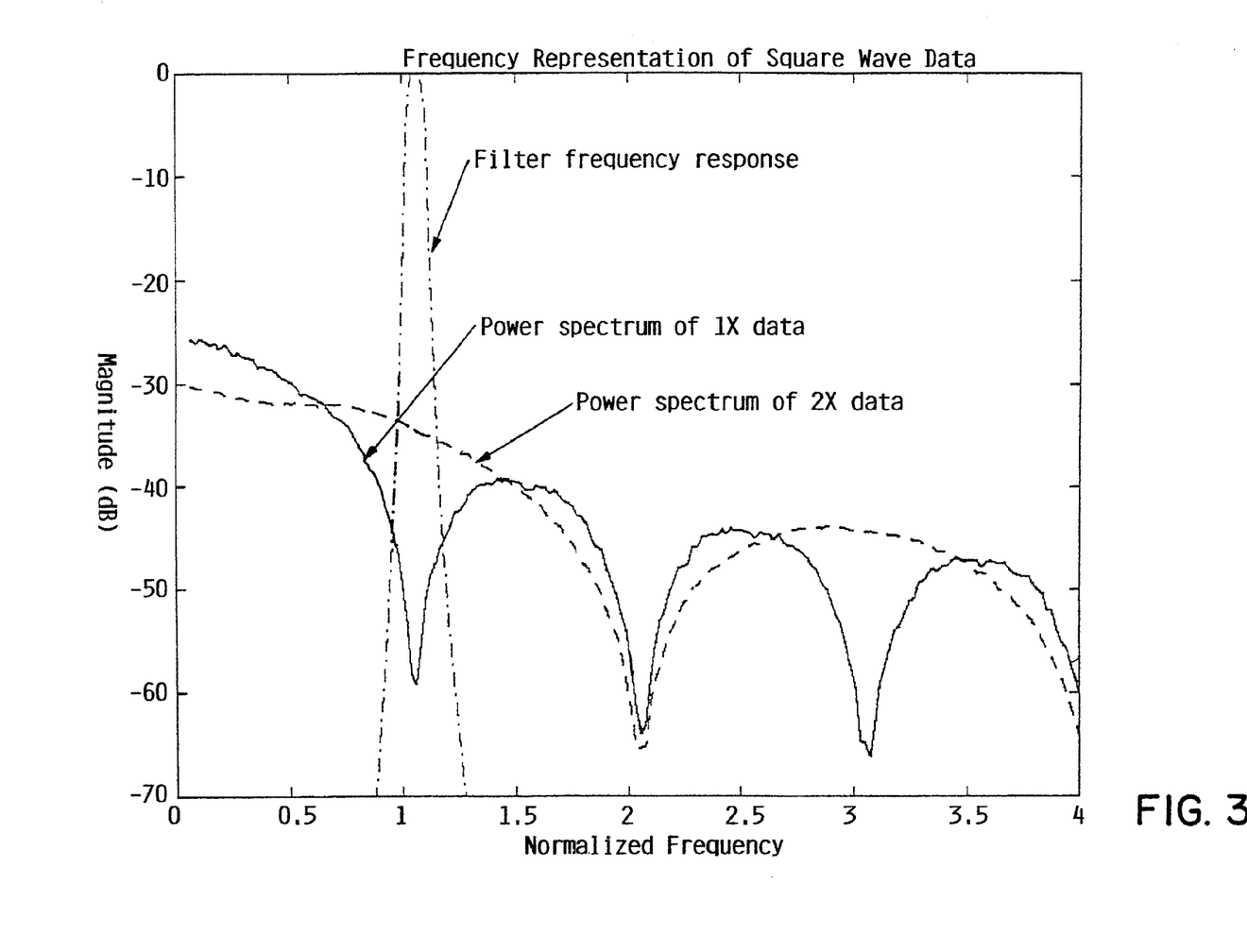
FIG. 3 is a graph of data at two different frequencies which are resolved by the data rate detector in accordance with an embodiment of the invention.

With respect to FIG. 3, there is shown a frequency representation of square wave data. When data is sent in the form of binary square waves, the envelope of the resultant frequency spectrum appears in the form of a sinc function: $sinc(x)=sin(x)/x$. Shown in FIG. 3 are two power spectra of binary data at two frequencies. The plots in FIG. 3 are normalized to a fundamental data rate denoted as 1×. When the fundamental data rate is present, the first null in the frequency spectrum is at the fundamental data rate and at each integer multiple (harmonic) of the fundamental data rate, see e.g., the nulls at 1, 2, 3, and 4 on the graph of FIG. 3. It follows then, that a data rate of twice the fundamental data rate would have a first null corresponding to twice the fundamental data rate. As seen in FIG. 3, when the fundamental data rate reaches its first null, a data rate that is twice as fast still has a large spectral power. In fact, the largest difference in spectral power between the two frequencies occurs at the fundamental data rate.

This phenomena was observed by the inventors who then implemented a bandpass filter to filter a narrow band of frequencies where the two data rates have a measurable, preferably the largest, difference in spectral power. The invention further works best when it is known that the actual transmission rate could be one of two or more known rates, e.g., with some optical transceivers it is known that the data rate is either 1.0625 Gb/s or 2.125 Gb/s. Knowing that the data rate may be one of two or more frequencies, which preferably are integer multiples of a fundamental data rate, and by filtering all the other frequencies, signals of only certain data rates will pass. Then a signal detector 224, such as a Loss of Signal (LOS) circuit, can then detect that frequency. The advantage of filtering a narrow band of frequencies is that in the time domain a narrowly filtered square wave will pass a sine wave. Filtering at twice the fundamental data rate results in a sine wave out of the filter whereas almost nothing will pass through when data at the fundamental rate is present.

Figure 4:
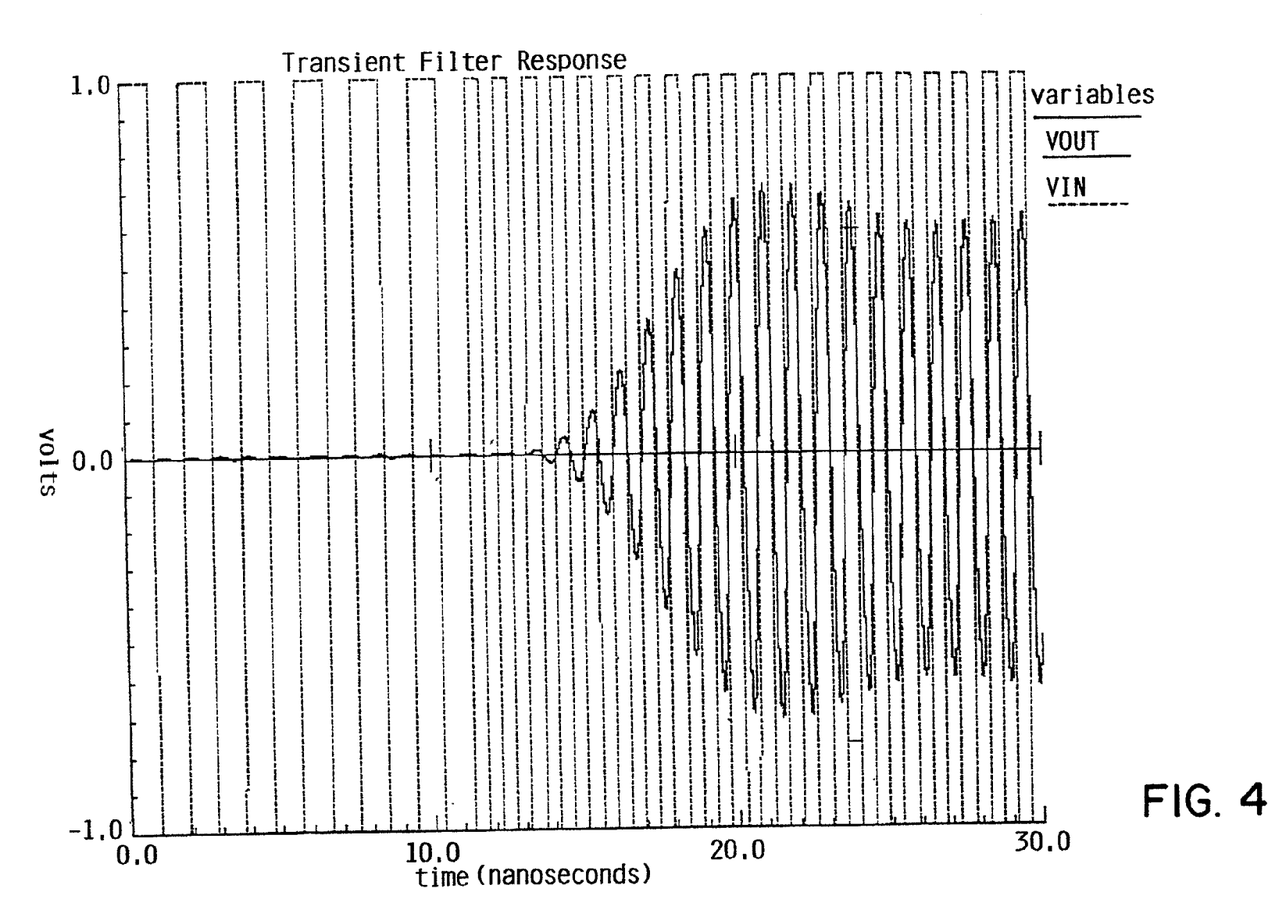
FIG. 4 is a graph of the response of a bandpass filter in which a lower data rate of 1.0625 Gb/s is not detected but a higher data rate of 2.125 Gb/s passes through the filter.

FIG. 4 illustrates a filtered voltage response as a function of time. The square waves represent the input to the bandpass filter and the sine waves are the filter's output. Actual 1.0625 Gb/s and 2.125 Gb/s data rates were used in demonstrating the time domain result of filtering and in the design of an actual lumped-element filter schematic. In the left half of FIG. 4 from time 0.0 to shortly after time 11.0 nanoseconds, a signal having a frequency of 1.0625 Gb/s is received as is indicated by the squared wave pulses having an amplitude of −1.0 to 1.0 volts. This signal is not detected as evidenced by the lack of sine waves present during these times. But shortly after time 11.0 nanoseconds, the data rate doubles as represented by the narrower pulses and at around time 13.0 nanoseconds, the filter starts to pass the doubled frequency as evidenced by the passed sine waves. Thus, from time 13.0 nanoseconds to the right edge of the graph, the doubled frequency is passed.

Figure 5:
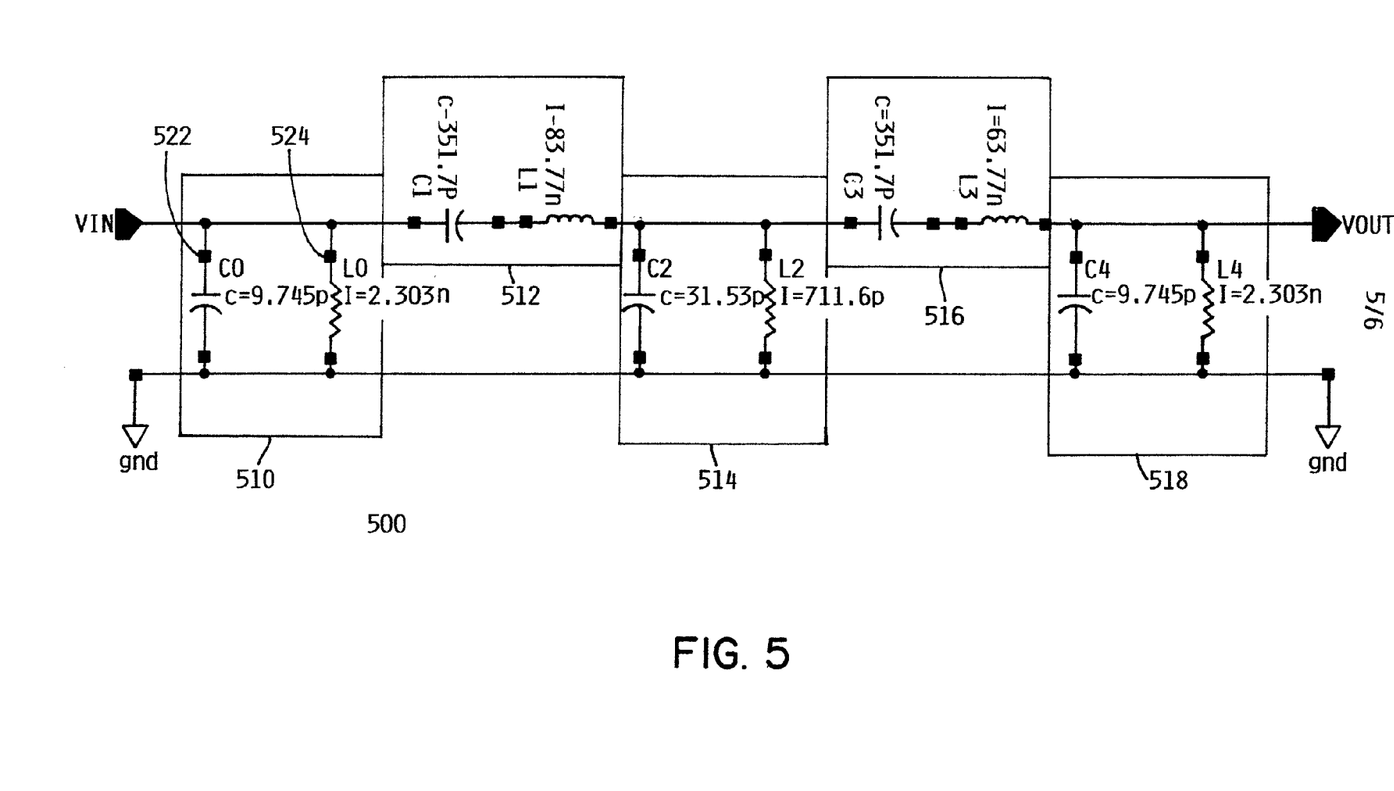
FIG. 5 is a circuit schematic of an example of a passive bandpass filter that could be used with the invention.

FIG. 5 is only one example of a bandpass filter. FIG. 5 illustrates a fifth order Butterworth filter which is a passive filter of five stages 510, 512, 514, 516, and 518, of capacitors 522 and inductors 524. Selecting the values of the capacitors and inductors as well as the number of stages determines the frequency and the bandwidth of the bandpass filter. To pass a narrow bandwidth frequency centered around 1.0625 GHz, for example, the capacitors in stages 510 and 518 had a value of 9.745 picofarads and the inductors had a value of approximately 2.303 nanohenries. Each capacitor in stages 512 and 516 had a value of 351.7 femtofarads and each inductor was 63.77 nanohenries. Stage 514 had a capacitor of 31.53 picofarads and an inductance of 711.6 picohenries. One of skill in the art will know how to implement bandpass filtering for particular frequencies and bandwidth.

Either passive or active filters could be implemented in the data rate detector of the invention. In fact, an active filter may work better for many reasons. The first reason to consider active filtering is the geometry of the filter would be smaller and integratable into existing on board ICs. Using such filters as biquad filters or transconductance $G_m$–C filters, it is possible to use operational amplifiers in the filter design instead of trying to design discrete inductors used in some passive filters. It is possible, moreover, to use a tunable filter which allows tuning the filter to fall precisely on the first null of the fundamental data rate's power spectrum and allows adjusting the filter to detect data rates other than just twice the fundamental data rate. One drawback of active filtering, however, is increased power consumption, but because the invention makes clock recovery circuitry unnecessary, this may not be a major drawback. Z-domain filtering for digital signals is also possible given the existence of an internal clock 226. Switched capacitor filters would fall into the z-domain filtering aspect and their performance would be relative to that discussed above using the s-domain Butterworth or analogy filters. Moreover, because this method of data rate discovery herein works with digital signals, the digital signal processing electronics and filters, rather than analog filters, may be used in the bandpass filter 222 and signal detector 224.

Figure 6:
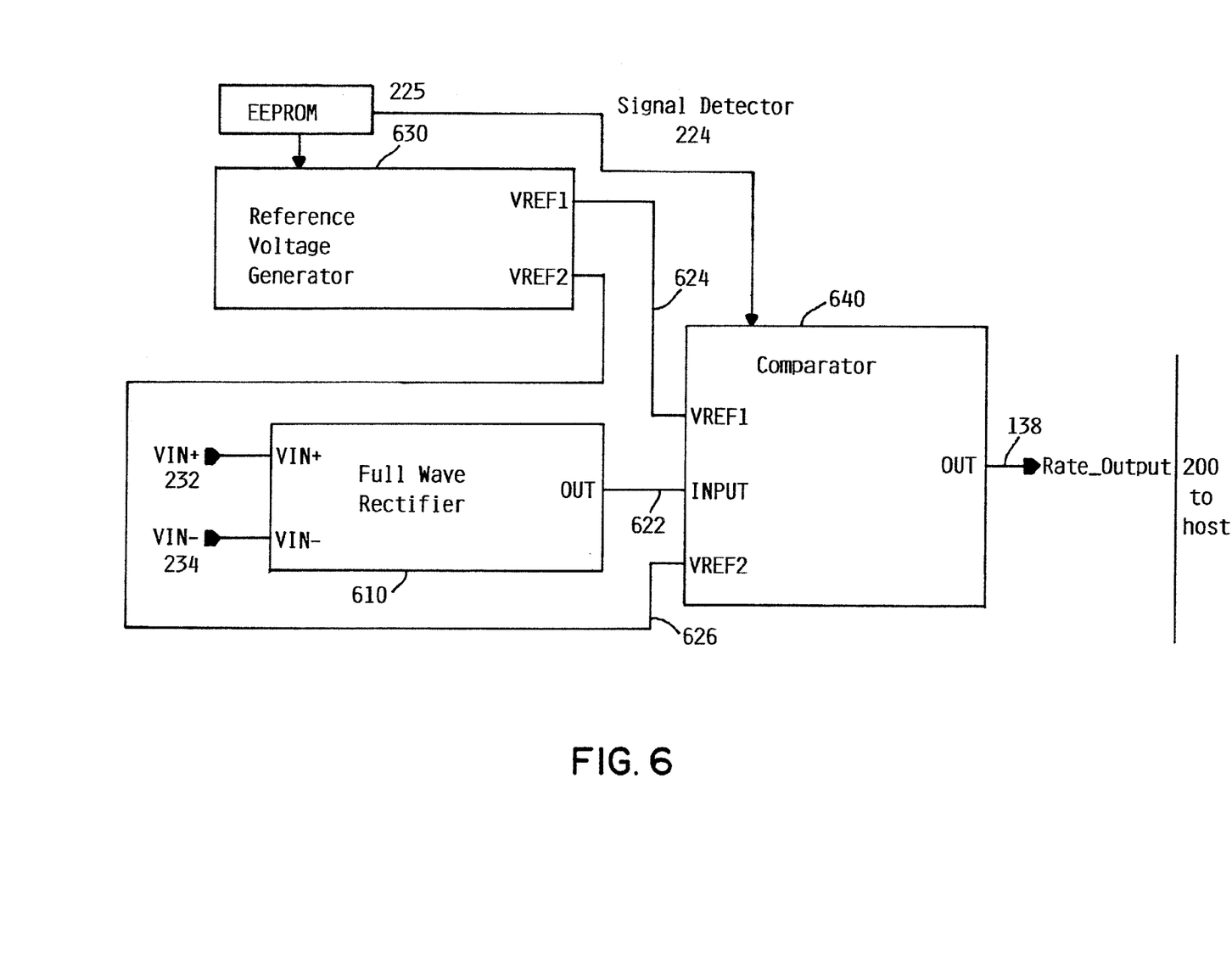
FIG. 6 is a simplified block diagram of a signal detector that could be used with the invention.

FIG. 6 demonstrates one possible signal detector circuit 224. The input signal 232 and its complement 234 carry the sine wave from the bandpass filter to a full wave rectifier 610. A full wave rectifier 610 is a known circuit that converts the sine wave to a DC signal 622. The DC signal 622 is a constant voltage, e.g., 0.5 volts, that is proportional to the size of the input sine waves 232, 234. This DC signal 622 goes to a comparator 640 which compares the signal 622 to two reference voltages 624 and 626 from the reference voltage generator 630. If the DC signal 622 is equal to voltage reference 624, then the output 138 from the comparator 640 would signify one data rate, e.g., 1.0625 Gb/s. If the DC signal 622 is equal to the other voltage reference 626 then the output 138 would signify another data rate, e.g., 2.125 Gb/s. For the data seen in FIG. 4, voltage reference 626 would be about 0.5 volts and voltage reference 624 would be 0 volts.

This data rate detection scheme is ideal for, but is not limited to integer multiple data rates. The salient features are knowing the possible data rates, filtering at particular frequencies, and choosing the filter frequency location. A filter can be implemented at any frequency in the frequency power spectrum where the data rates have a noticeable difference in spectral power. In fact, it is preferred that the greater the difference in spectral power between the frequencies, the easier it will be to distinguish the frequencies. The closer the data rates are in power, the more accurate the signal detection needs to be. If one data rate does not have a null at the filtering frequency, then, for example, a comparator setup could be used to detect one data rate from another. Also, the number of detectable data rates is only controlled by the filtering schemes used. Tunable filters using multiple filters and multiple signal detectors or a comparator with multiple reference voltages, for example, could be used to detect multiple data rates.

This data rate detector is preferably implemented in optical transceiver modules designed to operate at multiple bit rates, such as transceiver modules designed to operate at both 1.0625 Gb/s and 2.125 Gb/s. Transceivers that implement the data rate detector are able to automatically detect the signaling rate of an input signal and adjust critical performance parameters, such as receiver bandwidth, to ensure proper operation. Additionally, autonegotiation between transceivers becomes an easier problem to solve because the data rate detector described herein, when combined with the switchable-bandwidth receiver described in U.S. Ser. No. 09/574,239 now U.S. Pat. No. 6,862,322 entitled Switchable-Bandwidth Optical Receiver filed 19 May 2000, guarantees that the transceiver containing it will always operate properly at any appropriate bit-rate. Because the method of data rate autodetection described herein is relatively simple, it has a lower cost and is easier to implement than complex clock recovery circuits that typically require an oscillator to operate.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A data rate detector, comprising: an input interface to receive a digital signal having a data rate that is one of N known data rates; a passing frequency-selective filter assembly coupled to the input interface and including N−1 bandpass filters, each bandpass filter corresponding to a different one of the N known data rates; and each bandpass filter configured to pass a signal when a selected spectral power difference exists at the bandpass frequency between the data rate of the digital signal and a selected one of the other N known data rates; and N−1 signal detectors each coupled to a corresponding one of the N−1 bandpass filters; and each signal detector configured to detect the passed signal from the corresponding bandpass filter and each signal detector configured to output a data rate signal related to the passed signal; and wherein each bandpass filter includes a reference clock coupled thereto.

2. The data rate detector of claim 1, wherein the selected spectral power difference is the difference at the bandpass frequency between the spectral power value of the data rate of the digital signal and a corresponding spectral power value of a null of the selected one of the other of the N known data rates.

3. The data rate detector of claim 1, wherein the N known data rates are integer multiples of each other.

4. The data rate detector of claim 1 wherein each bandpass filter includes a tunable bandpass filter that includes logic to pass a signal corresponding to any one of a plurality of the N known data rates, the tunable bandpass filter operable for adjusting the bandpass frequency to correspond to a first null of the digital signal data rate.

5. The data rate detector of claim 1, wherein each bandpass filter is a tunable bandpass filter that is operable for adjusting the bandpass frequency to correspond to a first null of the digital signal data rate.

6. The data rate detector of claim 1, wherein each bandpass filter is an active filter.

7. The data rate detector of claim 6, wherein each active filter comprises a DSP filter.

8. An optical transceiver, comprising: (a) an optical receiver having a photodetector to receive an optical input at an input interface and a transimpedance amplifier to generate an output electrical signal in response thereto, (b) a frequency-selective filter assembly coupled to the input interface and including N−1 bandpass filters, each bandpass filter corresponding to a different one of N known data rates; and each bandpass filter configured to pass a signal when a selected spectral power difference exists at the bandpass frequency between the data rate of the input signal and a selected one of the other N known data rates; and N−1 signal detectors each coupled to a corresponding one of the N−1 bandpass filters; and each signal detector configured to detect the passed signal from the corresponding bandpass filter and each signal detector configured to output a corresponding data rate signal related to the passed signal; and wherein each bandpass filter includes a reference clock coupled thereto; (c) a post amplifier connected to the signal detectors and the optical receiver; (d) a host interface connected to couple outputs of the signal detectors and the post amplifier to a host system; and in response to the output of the signal detectors, the optical receiver and/or the transimpedance amplifier and/or the post amplifier and/or the host adapt to a the data rate of the optical input.

9. The optical transceiver of claim 8, further comprising: (a) an ac modulator to receive host input through the host interface and generate an electrical output; and (b) an optical transmitter to receive the electrical output of the ac modulator and in response thereto generate an optical output.

10. The optical transceiver of claim 9, wherein the optical output is at the data rate of the optical input.

11. The optical transceiver of claim 9, wherein the optical transmitter is a laser.

12. A method of detecting the data rate of a data signal, comprising: (a) receiving the data signal having a data rate that is one of N known data rates; (b) utilizing a frequency-selective filter assembly including N−1 bandpass filters, each bandpass filter corresponding to a different one of the N known data rates and each bandpass filter passing a signal when a selected spectral power difference exists at the bandpass frequency between the data rate of the data signal and a selected one of the other of the N known data rates; and each bandpass filter receiving a reference clock and filtering based on the received reference clock; and, (c) passing an output from each bandpass filter to a corresponding signal detector and outputting a data rate signal from each signal detector.

13. The method of claim 12, wherein the selected power difference is the difference at the bandpass frequency in spectral power between a null of the data rate of the data signal and a corresponding spectral power value at the selected one of the other N known data rates.

14. The method of claim 13, wherein the data rate signal has a voltage indicative of the data rate.

15. The method of claim 14, wherein each bandpass filtering step is accomplished by an active filter.

16. A data rate detector, comprising: an input interface to receive a digital signal having a data rate that is one of N known data rates; a passing frequency-selective filter assembly coupled to the input interface and including N−1 tunable bandpass filters, each tunable bandpass filter corresponding to a different one of the N known data rates; and each tunable bandpass filter configured to pass a signal when a selected spectral power difference exists at the bandpass frequency between the data rate of the digital signal and a selected one of the other N known data rates; and N−1 signal detectors each coupled to a corresponding one of the N−1 tunable bandpass filters; and each signal detector configured to detect the passed signal from the corresponding tunable bandpass filter and each signal detector configured to output a data rate signal related to the passed signal; and wherein each bandpass filter includes a reference clock coupled thereto; at least one feedback path to a tunable bandpass filter to adjust the bandpass frequency to optimize transmission in response to the data rate signal; and, a host interface to transmit the data rate signal outside the data rate detector.

* * * * *